United States Patent [19]

Froehlich

[11] Patent Number: 4,869,631

[45] Date of Patent: Sep. 26, 1989

[54] EXPANSION DOWEL WITH LIMITED EXPANSION

[75] Inventor: Peter Froehlich, Neuried, Fed. Rep. of Germany

[73] Assignee: Hilti Aktiengesellschaft, Fürstentum, Liechtenstein

[21] Appl. No.: 200,640

[22] Filed: May 31, 1988

[30] Foreign Application Priority Data

Jun. 9, 1987 [DE] Fed. Rep. of Germany ....... 3719164

[51] Int. Cl.⁴ ............................................. F16B 13/06
[52] U.S. Cl. ......................................... 411/55; 411/57
[58] Field of Search ..................................... 411/44-57, 411/60, 63, 69, 71-74; 52/704; 405/258, 259

[56] References Cited

U.S. PATENT DOCUMENTS

| 1,755,264 | 4/1930 | Mirzan | 411/60 |
| 1,959,439 | 5/1934 | McIntosh | 411/53 |
| 2,319,376 | 5/1943 | Wallace | 411/53 |
| 4,028,988 | 6/1977 | Schäfers | 411/44 |
| 4,447,182 | 5/1984 | Murbach | 405/259 X |
| 4,607,992 | 8/1986 | Mauritz et al. | 411/55 X |
| 4,627,775 | 12/1986 | Dixon | 411/69 X |

FOREIGN PATENT DOCUMENTS

| 228096 | 5/1960 | Australia | 411/55 |
| 0008085 | 2/1980 | European Pat. Off. | 411/55 |
| 2536137 | 4/1986 | Fed. Rep. of Germany . | |
| 549447 | 10/1956 | Italy | 411/55 |
| 433671 | 9/1967 | Switzerland | 411/55 |
| 906615 | 9/1962 | United Kingdom | 411/51 |

Primary Examiner—Gary L. Smith
Assistant Examiner—Douglas E. Ringel
Attorney, Agent, or Firm—Toren, McGeady & Associates

[57] ABSTRACT

An expansion dowel assembly includes an expansion sleeve, an expanding member and a bolt for pulling the expanding member into the expansion sleeve. The expansion sleeve has a leading end and a trailing end with a bore extending between its two ends. At the leading end, the bore is conically shaped and converges toward the trailing end. From the trailing end of the conically shaped section, the bore is cylindrically shaped and extends toward the trailing end to another smaller diameter cylindrically shaped section of the bore. At the transition between the two cylindrically shaped sections there is a stop shoulder which limits the pulling-in action of the expanding member and the radial widening of the expansion sleeve.

6 Claims, 2 Drawing Sheets

EXPANSION DOWEL WITH LIMITED EXPANSION

BACKGROUND OF THE INVENTION

The present invention is directed to an expansion dowel with an expansion sleeve having axially extending slots from the leading end toward the trailing end, an expanding member with a truncated conical shape can be pulled into the leading end of the sleeve for effecting the expanding action, and the expansion sleeve has an axially extending bore which is conically shaped for a section from the leading end within the slotted region of the sleeve. The conical shape of the expanding member corresponds to the conically shaped section of the bore.

Expansion dowels of the above type are known such as disclosed in DE-PS No. 2 536 137 and in actual use have a residual expansion behavior, that is, they have increased expansion, and are used principally in the middle and lower load regions. For specialized applications, such as in material which tends to crack, such expansion dowels cannot be used without possible problems. If a crack extends directly through the borehole it can be widened due to increased expansion, and the anchoring value of the dowel is noticeably reduced. In extreme cases such increased or over-expansion of the dowel can lead to spalling or destruction of the receiving material or structure and, as a result, to failure of the dowel.

SUMMARY OF THE INVENTION

Therefore, the primary object of the present invention is to provide an expansion dowel with limited residual expansion behavior.

In accordance with the present invention, the bore in the expansion sleeve is provided with a cylindrical section following the conically shaped section at the leading end. The diameter of the cylindrical section corresponds to the least diameter of the conically shaped section. Another cylindrically shaped section extends between the trailing end of the sleeve and the cylindrical section extending from the conically shaped section.

As long as the expanding member is located in the conically shaped section of the bore in the expansion sleeve, a relatively large widening or expansion of the sleeve results under a tensile load applied to the expanding member. Due to the conical shape of the widening region of the sleeve corresponding to the conical shape of the expanding member, the widening of the sleeve takes place approximately parallel to the axis of the expansion sleeve. When the expanding member reaches the cylindrically shaped bore section in the sleeve, a residual or increased expansion of the sleeve takes place if a tensile load is applied to the expanding member. The expansion of the sleeve is, however, smaller than if the expanding member were present in the conically shaped section. During initial expansion of the dowel it is noticeable by a slight rise in the pulling force which must be applied to effect the increased expansion. The residual expansion travel is limited by the axial length of the cylindrically shaped section adjacent the conically shaped section.

It is useful, to establish a specific end position of the expanding member and thus a defined maximum expanded state of the dowel, to form a transition from the cylindrical shaped bore section adjacent the conically shaped bore section to the smaller diameter cylindrically shaped bore section extending to the trailing end of the sleeve with the transition acting as an annular stop shoulder for the expanding member. If the expanding member runs up against the stop shoulder in the course of the expanding procedure, there is a noticeable sudden steep rise in the required tension force, that is, the force pulling the expanding member toward the trailing end of the dowel. Overstressing of the expansion dowel can be avoided by affording a partial deformation of the stop shoulder.

In one embodiment, the stop shoulder extends perpendicular to the axis of the expansion sleeve providing a planar face for contact with the expanding member. As a result, axial pressure developed at the contact of the expanding member with the stop shoulder is equally distributed around the periphery of the trailing end face of the expanding member.

In another embodiment it is useful to form the stop shoulder as a concave surface. Such a concave arrangement enables a soft run-up or contact of the expanding member against the stop shoulder at the end of the residual expansion step. Due to the concavely shaped surface of the shoulder, the expanding member slides over the shoulder and is simultaneously centered. With expanding members formed with sharp edges initially there is a line contact between the expanding member and the stop shoulder. By deformation of the expanding member on one hand and the stop shoulder on the other hand, an area contact of the expanding member is generated as the expanding member continues to move in the axial direction toward the trailing end. The curvature of the stop shoulder can be uniform or variable, whereby preferably the radius of curvature diminishes in the direction toward the trailing end of the expansion sleeve.

In still another embodiment, the transverse surface of the stop shoulder can be inclined at an acute angle with respect to the axis of the expansion sleeve. The inclination of the stop shoulder can be directed radially outwardly toward the leading end or the trailing end of the sleeve. If the inclination is toward the leading end of the expansion sleeve, a conically shaped countersink is formed. If the inclination of the stop shoulder surface is toward the trailing end of the sleeve, an annularly shaped projection is formed at the stop shoulder and this projection can be deformed when contacted by the expanding member. Such a deformation zone prevents overstressing of the dowel.

The axial length of the conically shaped section extending from the leading end of the expansion sleeve corresponds essentially to the axial length of the conically shaped expanding member. With such corresponding dimensions, the expanding member is located completely in the conically shaped section at the end of the first expansion phase. As the expanding member is pulled further into the expansion sleeve toward the trailing end, the leading end of the expansion sleeve is no longer in the region of the expanding member and thus can return or rebound to some degree toward its original configuration. As a result, the pulling of the expanding member further into the expansion sleeve in the second phase is facilitated.

Furthermore, the axial length of the cylindrical section of the expansion sleeve bore adjacent the conically shaped section has basically the same axial length as the frusto-conically shaped expanding member. When the expanding member comes to rest at the trailing end of this cylindrically shaped section of the bore, it is located completely within the cylindrically shaped section and is no longer located in the conically shaped section. Maximum widening of the expansion sleeve is thus located in the transitional region between the conically shaped section and the cylindrically shaped section. Such an arrangement affords an effective uniform distribution of the expansion pressure in the borehole and prevents overstressing of the receiving material in which the borehole is formed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
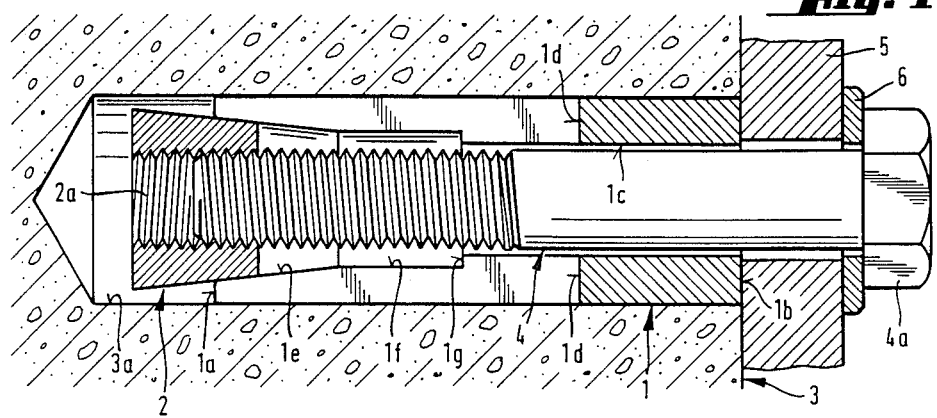
FIG. 1 is an axially extending sectional view of an expansion dowel embodying the present invention and illustrated in the unexpanded state.
Figure 2:
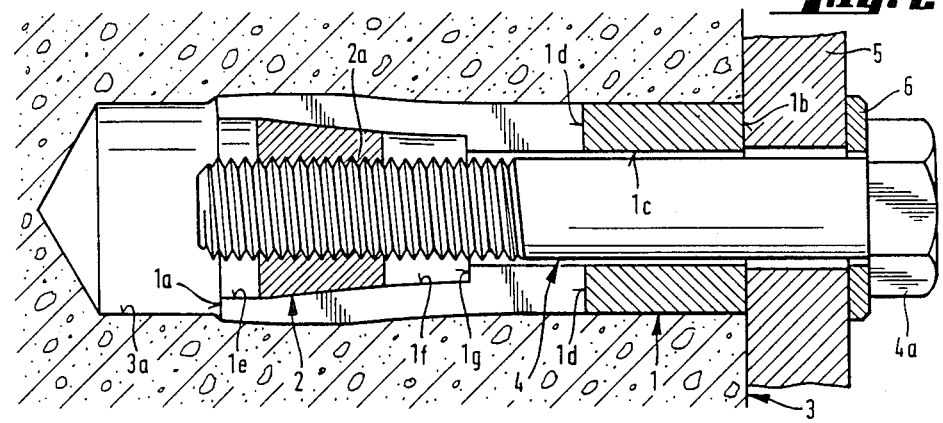
FIG. 2 is a view similar to that of the expansion dowel in FIG. 1, however, in a partially expanded state.
Figure 3:
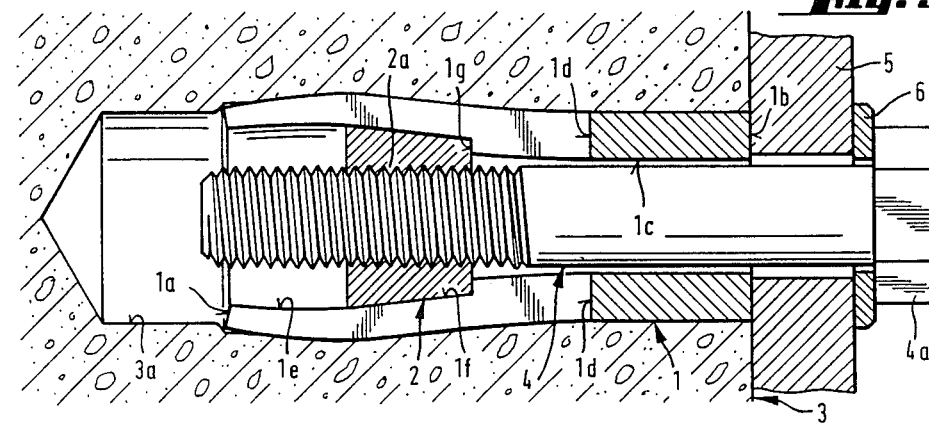
FIG. 3 is a view of the expansion dowel similar to that shown in FIGS. 1 and 2, however, displaying the dowel in the maximum expanded state.

In FIGS. 1, 2 and 3 an expansion dowel is shown made up of an axially elongated expansion sleeve 1 having a leading end 1a and a trailing end 1b with a frusto-conically shaped expanding member 2 located in the leading end of the expansion sleeve so that it can be pulled into the sleeve for effecting the required expansion. Expansion sleeve 1 has a throughbore extending from its trailing end to its leading end. In addition, the sleeve has axially extending slots 1d extending from the leading end 1a for a portion of the axial length of the sleeve. The bore is divided into several axially extending sections with a conically shaped first section 1e extending from the leading end toward the trailing end of the sleeve and with the diameter of the first section reducing in the direction toward the trailing end. A cylindrically shaped second section 1f extends from the smallest diameter end of the first section 1e toward the trailing end of the sleeve. A cylindrically shaped third section 1c extends from the trailing end of the second section to the trailing end of the sleeve, and the third section has a smaller diameter than the second section. As a result, an annular stop shoulder 1g is formed at the transition from the second section to the third section, that is, it is formed at the trailing end of the second section 1f. As viewed in FIGS. 1 to 3, the expansion dowel is inserted into a borehole 3a formed in a receiving material 3. The larger diameter end of the expanding member 2 is less than the outside diameter of the expansion sleeve 1 so that it does not interfere with the insertion of the dowel into the borehole 3a. Note that the expanding member 2 extends into the leading end of the first section 1e of the bore through the sleeve in the unexpanded state as shown in FIG. 1. After insertion of the expansion sleeve 1 and the expanding member 2 into the borehole in the receiving material, a bolt 4 is placed through a structural component 5, to be attached to the receiving material, into the expansion sleeve 1 and is threaded into an inside thread 2a of the expanding member 2. A washer 6 is positioned between head 4a of the bolt 4 and the structural component 5 to be attached. By turning the head 4a of the bolt 4, the expanding member is pulled into the conically shaped section of the bore in the expansion sleeve and the sleeve is expanded, note FIG. 2. With continued turning of the head 4a of the bolt, that is, applying a pulling force on the expanding member 2, the expanding member moves toward the trailing end of the sleeve.

In FIG. 2 the expanding member 2 has been pulled completely into the conically shaped section 1e in the expansion sleeve 1 so that the leading end of the expanding member is located inwardly from the leading end 1a of the sleeve. As an additional pulling force is applied by the bolt 4 on the expanding member 2, the expanding member is pulled into the cylindrically shaped second section 1f of the bore continuing to expand the sleeve. The end of the expanding procedure is displayed in FIG. 3. The trailing end of the expanding member 2 bears against the stop shoulder 1g. The maximum possible radial widening of the expansion sleeve 1 has been effected. If a further pulling force is exerted on the expanding member 1 by the bolt 4 only the stop shoulder 1g can be deformed.

Figure 4:
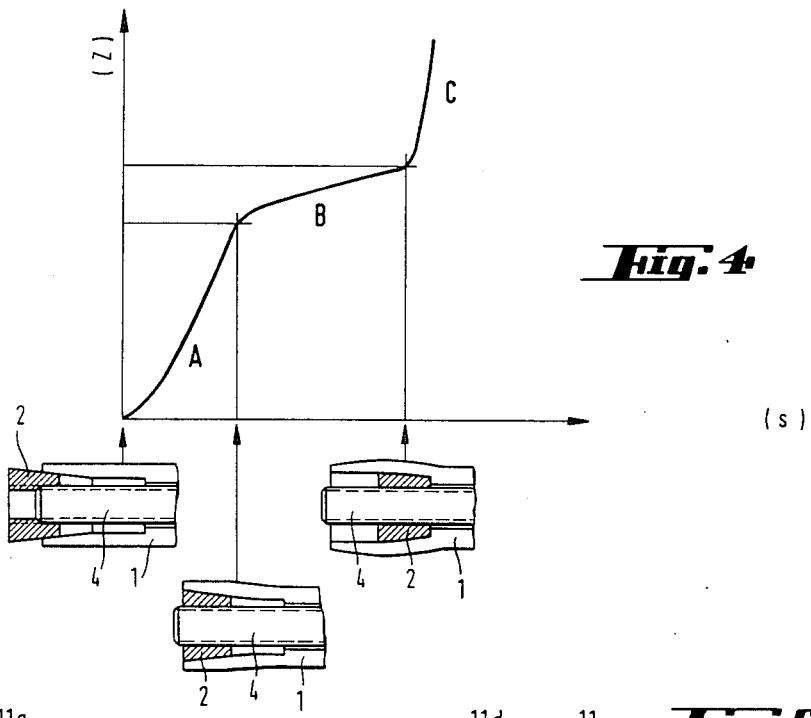
FIG. 4 is a graph illustrating the load characteristic of the dowel according to the present invntion as illustrated in FIGS. 1, 2 and 3.

In FIG. 4 there is a graphical illustration showing a curve of the displacement travel s as a function of the applied pulling force Z. As shown in FIG. 4, the displacement travel s is approximately proportional to the applied pulling force, as long as the expanding member is located in the region of the conically shaped first section 1e, that is, part A of the curve. When the expanding member reaches the cylindrically shaped second section 1f of the bore than a considerably greater displacement travel s is achieved with a slight additional load or pulling force Z, note part B of the curve. When the trailing end of the expanding member 2 contacts the stop shoulder 1g, there is a steep rise in the pulling force, note part C of the curve. This steep rise is clearly noticeable during the expansion of the dowel.

Figure 5:
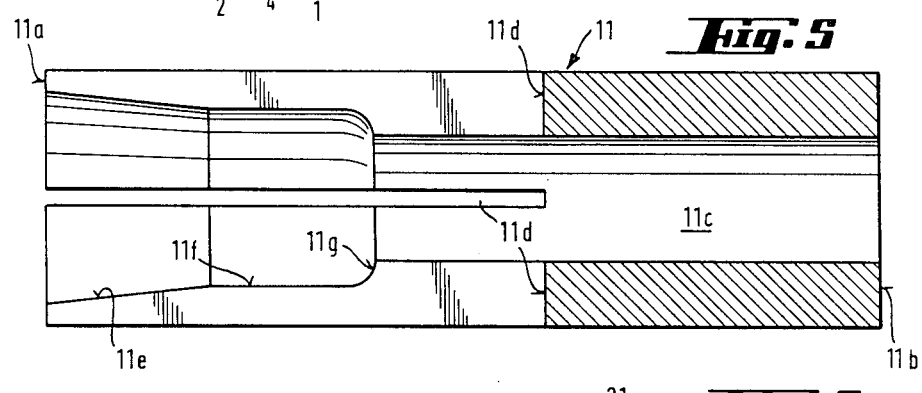
FIG. 5 is an axially extending sectional view of another expansion sleeve of the dowel of the present invention.
Figure 6:
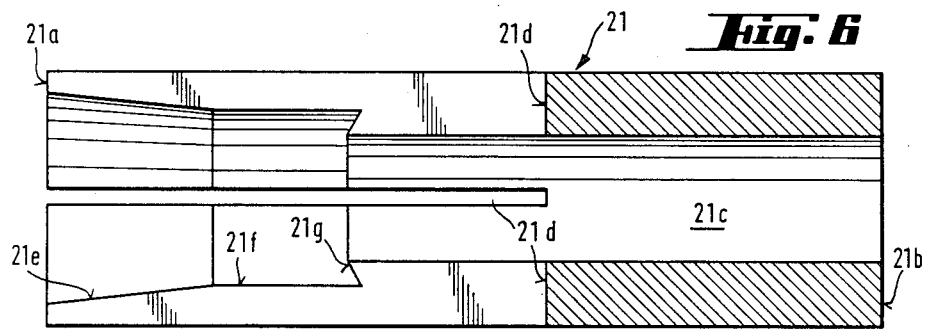
FIG. 6 is a view similar to FIG. 5 of yet another expansion sleeve of the dowel embodying the present invention.

In FIGS. 5 and 6 additional expansion sleeves 11, 21 are illustrated each with a different stop shoulder 11g, 21g. The differences in these expansion sleeves over the embodiment displayed in FIGS. 1 to 3 involves only the arrangement of the stop shoulder. In FIG. 5 the reference numerals have been increased by 10 and in FIG. 6 the reference numerals have been increased by 20 as compared to the reference numerals used in FIGS. 1 to 3. Stop shoulder 11g in FiG. 5 has a concave curvature. Such a configuration of the stop shoulder 11g controls the run-up of the expanding member 2 against the stop shoulder 11g, that is, the contact of the expanding member with the stop shoulder 11g does not take place as suddenly or with the force as in the contact of the expanding member 2 with the stop shoulder 1g which extends perpendicular to the axis of the expanding sleeve. Accordingly, the contact of the expanding member with the concavely shaped stop shoulder takes place in a softer and more progressive manner. The radius of curvature of the stop shoulder 11g can be uniform for the extent of the shoulder or can vary along the shoulder.

In the expansion sleeve 21 illustrated in FIG. 6, stop shoulder 21g is inclined at an acute angle relative to the axis of the expansion sleeve. The inclination or slope of the stop shoulder 21g extends toward the leading end of the sleeve as it extends radially inwardly affording an undercut arrangement or a projection. Initially the projection formed by the stop shoulder 21g is contacted by the expanding member at the radially inner edge of the shoulder. The projection formed by the stop shoulder 21g can be deformed when contacted by the expanding member 2. This embodiment also results in a softer contact of the expanding member 2 with the stop shoulder 21g on the expansion sleeve 21.

While specific embodiments of the invention have been shown and described in detail to illustrate the application of the inventive principles, it will be understood that the invention may be embodied otherwise without departing from such principles.

I claim:

1. Expansion dowel comprising an axially elongated expansion sleeve having a leading end and a trailing end spaced apart in the axial direction, said sleeve having axially extending slots extending from the leading end toward the trailing end, a frusto-conically shaped expanding member located at and arranged to be pulled into the leading end of said expansion sleeve, said expansion sleeve has an axially extending bore therethrough from the trailing end to the leading end, said bore having a conically shaped first section adjacent the leading end and extending toward the trailing end with the diameter of said first section reducing toward the trailing end, the frusto-conical surface of said expanding member cooresponds to the conically shaped surface of said first section, wherein the improvement comprises that said bore includes a cylindrically shaped second section extending from the smaller diameter end of said first section toward the trailing end and having a diameter corresponding to the smaller diameter end of said first section, and said bore having a third section extending from said trailing end to said second section and having a diameter smaller than the diameter of the second section, and means insertable through said bore from the trailing end thereof for pulling said expanding member into the leading end of said expansion sleeve and toward the trailing end thereof, the junction of said second section and third section of the bore in said expansion sleeve forms a stop shoulder extending transversely of the axial direction of said expansion sleeve, and said stop shoulder has a concavely shaped surface curving inwardly from the diameter of the second section of said sleeve to the diameter of the third section of said sleeve.

2. Expansion dowel, as set forth in claim 1, wherein the axial length of said first section of said bore in said expansion sleeve corresponds substantially to the axial length of said expanding member.

3. Expansion dowel, as set forth in claim 1, wherein the axial length of the second section of said bore in said expansion sleeve corresponds substantially to the axial length of said expanding member.

4. Expansion dowel comprising an axially elongated expansion sleeve having a leading end and a trailing end spaced apart in the axial direction, said sleeve having axially extending slots extending from the leading end toward the trailing end, a frusto-conically shaped expanding member located at and arranged to be pulled into the leading end of said expansion sleeve, said expansion sleeve has an axially extending bore therethrough from the trailing end to the leading end, said bore having a conically shaped first section adjacent the leading end and extending toward the trailing end with the diameter of said first section reducing toward the trailing end, the frusto-conical surface of said expanding member corresponds to the conically shaped surface of said first section, wherein the improvement comprises that said bore includes a cylindrically shaped second section extending from the smaller diameter end of said first section toward the trailing end and having a diameter corresponding to the smaller diameter end of said first section, and said bore having a third section extending from said trailing end to said second section and having a diameter smaller than the diameter of the second section, and means insertable through said bore from the trailing end thereof for pulling said expanding member into the leading end of said expansion sleeve and toward the trailing end thereof, the junction of said second section and third section of the bore in said expansion sleeve forms a stop shoulder extending transversely of the axial direction of said expansion sleeve, and said stop shoulder is inclined at an acute angle relative to the axis of said expansion sleeve and extends toward the leading end of the expansion sleeve as it extends radially inwardly from the inside surface of the second section to the inside surface of the third section of the bore in said expansion sleeve.

5. Expansion dowel, as set forth in claim 4, wherein the axial length of said first section of said bore in said expansion sleeve corresponds substantially to the axial length of said expanding member.

6. Expansion dowel, as set forth in claim 4, wherein the axial length of the second section of said bore in said expansion sleeve corresponds substantially to the axial length of said expanding member.

* * * * *